US010744862B2

United States Patent
Sekiguchi et al.

(10) Patent No.: US 10,744,862 B2
(45) Date of Patent: Aug. 18, 2020

(54) ELECTRIC VEHICLE

(71) Applicant: TOYOTA JIDOSHA KABUSHIKI KAISHA, Toyota-shi, Aichi-ken (JP)

(72) Inventors: Tadashi Sekiguchi, Ashigarakami-gun (JP); Yushi Seki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 16/132,747

(22) Filed: Sep. 17, 2018

(65) Prior Publication Data

US 2019/0092157 A1 Mar. 28, 2019

(30) Foreign Application Priority Data

Sep. 27, 2017 (JP) ................. 2017-186942

(51) Int. Cl.
*B60K 1/00* (2006.01)
*B60K 25/00* (2006.01)

(52) U.S. Cl.
CPC ............... *B60K 1/00* (2013.01); *B60K 25/00* (2013.01); *B60K 2001/001* (2013.01); *B60K 2025/005* (2013.01)

(58) Field of Classification Search
CPC .... B60K 1/00; B60K 2001/001; B60K 25/00; B60K 2025/005
See application file for complete search history.

(56) References Cited

U.S. PATENT DOCUMENTS

| 9,303,698 B2* | 4/2016 | Sugiyama | ........... F16H 57/0445 |
| 2016/0052379 A1* | 2/2016 | Inoue | ..................... B60K 6/387 |
| | | | 74/661 |

FOREIGN PATENT DOCUMENTS

| JP | 2011-220374 A | 11/2011 |
| JP | 2012-066673 A | 4/2012 |
| JP | 2012-096676 A | 5/2012 |
| JP | 5499606 B2 | 5/2014 |
| JP | 5669878 B2 | 2/2015 |
| JP | 2016-033374 A | 3/2016 |

* cited by examiner

*Primary Examiner* — Erin D Bishop
(74) *Attorney, Agent, or Firm* — Oliff PLC

(57) ABSTRACT

An electric vehicle is provided with an electric motor serving as a driving source and is not provided with an internal combustion engine from which power is transmitted to drive wheels driven by power from the electric motor. The electric vehicle includes: a torque converter that is disposed coaxially with an output shaft of the electric motor, and to which the power is transmitted from the electric motor; an automatic transmission disposed on a power transmission path between the electric motor and the drive wheels, and configured to achieve a shift stage at which the power is interrupted; and a mechanical oil pump driven by the power from the electric motor, and disposed on the power transmission path, at a position upstream of the automatic transmission in a direction of power transmission from the electric motor to the drive wheels. The mechanical oil pump is disposed in the electric motor.

4 Claims, 9 Drawing Sheets

ELECTRIC VEHICLE

INCORPORATION BY REFERENCE

The disclosure of Japanese Patent Application No. 2017-186942 filed on Sep. 27, 2017 including the specification, drawings and abstract is incorporated herein by reference in its entirety.

BACKGROUND

1. Technical Field

The present disclosure relates to an electric vehicle.

2. Description of Related Art

In an electric vehicle described in Japanese Unexamined Patent Application Publication No. 2016-033374 (JP 2016-033374 A), a motor generator is connected to an input shaft of an automatic transmission. The torque transmitted from the motor generator to the automatic transmission through the input shaft is changed at a predetermined gear ratio, and the changed torque is then output from an output shaft of the automatic transmission. Then, the torque output from the output shaft is transmitted to drive wheels via a differential and drive shafts.

SUMMARY

However, the electric vehicle described in JP 2016-033374 A still has room for improvement in the following respect. Specifically, if the range of gear ratios of the automatic transmission is set to a range of higher gear ratios in order to enable the torque output from the motor generator to be further increased and then transmitted to the drive wheels, it is necessary to increase the number of shafts of the automatic transmission or to increase the sizes of gears of the automatic transmission. This may reduce the flexibility in an installation space. Alternatively, if the size of the motor generator is increased in order to increase the output torque without setting the range of gear ratios of the automatic transmission to a range of higher gear ratios, a cost increase may occur.

The present disclosure provides an electric vehicle configured to increase the torque that is transmitted from an electric motor to drive wheels without causing reduction in the flexibility in an installation space due to setting of the range of gear ratios of an automatic transmission to a range of higher gear ratios and without causing a cost increase due to an increase in size of the electric motor.

An aspect of the present disclosure relates to an electric vehicle that is provided with an electric motor serving as a driving source, and that is not provided with an internal combustion engine from which power is transmitted to drive wheels driven by power from the electric motor. The electric vehicle includes a torque converter, an automatic transmission, and a mechanical oil pump. The torque converter is disposed coaxially with an output shaft of the electric motor. The power is transmitted to the torque converter from the electric motor. The automatic transmission is disposed on a power transmission path between the electric motor and the drive wheels. The automatic transmission is configured to achieve a shift stage at which the power is interrupted. The mechanical oil pump is driven by the power from the electric motor. The mechanical oil pump is disposed on the power transmission path, at a position upstream of the automatic transmission in a direction of power transmission from the electric motor to the drive wheels. The mechanical oil pump is disposed in the electric motor.

With this configuration, the width of the electric vehicle in an axial direction of a rotor shaft of the electric motor can be made less than that when the oil pump is disposed coaxially with the electric motor and alongside the electric motor.

In the electric vehicle according to the above aspect of the present disclosure, an output shaft of the torque converter may be provided with a bevel gear meshing with a final driven gear.

With this configuration, a counter shaft need not be disposed, and thus it is possible to achieve cost reduction, an increase in the flexibility in an installation space, weight reduction, and so forth.

In the electric vehicle according to the above aspect of the present disclosure, the automatic transmission may be disposed in the electric motor.

With this configuration, the width of the electric vehicle in the axial direction of the rotor shaft of the electric motor can be made less than that when the automatic transmission is disposed coaxially with the electric motor and alongside the electric motor.

In the electric vehicle according to the above aspect of the present disclosure, the automatic transmission may include: a transmission input shaft and a transmission output shaft that are disposed in parallel to each other; a low-speed shifting mechanism; a high-speed shifting mechanism; a synchromesh dog clutch; and a friction clutch. The low-speed shifting mechanism achieves a low-speed shift stage. The low-speed shifting mechanism is disposed on a power transmission path between the transmission input shaft and the transmission output shaft. The low-speed shifting mechanism is disposed coaxially with the transmission output shaft. The high-speed shifting mechanism achieves a high-speed shift stage. The high-speed shifting mechanism is disposed on the power transmission path between the transmission input shaft and the transmission output shaft. The high-speed shifting mechanism is disposed coaxially with the transmission input shaft. The synchromesh dog clutch permits and interrupts power transmission between the transmission output shaft and the low-speed shifting mechanism. The friction clutch permits and interrupts power transmission between the transmission input shaft and the high-speed shifting mechanism.

With this configuration, the responsiveness during downshifting is kept sufficiently high.

In the electric vehicle according to the above aspect of the present disclosure, the torque converter is disposed coaxially with the output shaft of the electric motor, and thus the torque generated by the electric motor for driving the drive wheels can be amplified by the torque converter. As a result, it is possible to increase the torque that is transmitted from the electric motor to the drive wheels without causing reduction in the flexibility in an installation space due to setting of the range of gear ratios of the automatic transmission to a range of higher gear ratios and without causing a cost increase due to an increase in size of the electric motor. In addition, in a state where the automatic transmission is in a neutral state, the oil pump can be driven by the power from the electric motor, for example, while the vehicle is at a standstill.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, front-engine front-drive (FF) electric vehicles according to example embodiments of the present disclosure will be described. Note that the following embodiments are not intended to limit the technical scope of the present disclosure. Applicable embodiments of the present disclosure may be applied to, for example, a rear-engine rear-drive (RR) electric vehicle. Applicable embodiments of the present disclosure may also be applied to a fuel cell vehicle and a range-extender vehicle including an internal combustion engine for electricity generation.

First Embodiment

Figure 1:
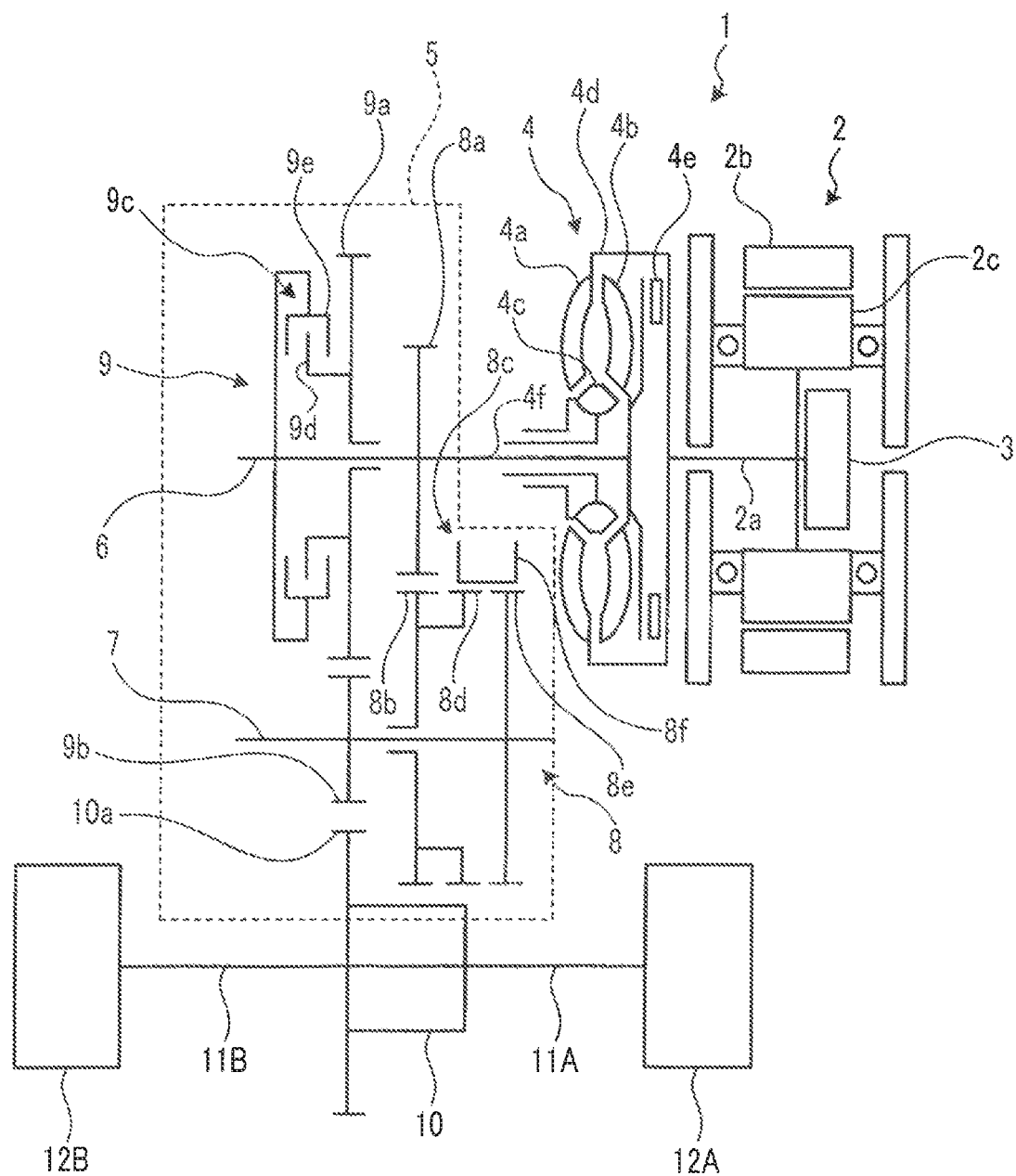
FIG. 1 is a skeleton diagram illustrating the schematic configuration of an electric vehicle according to a first embodiment.

FIG. 1 is a skeleton diagram illustrating the schematic configuration of an electric vehicle 1 according to a first embodiment. As illustrated in FIG. 1, the electric vehicle 1 includes, as powertrain components, a motor generator 2, a mechanical oil pump 3, a torque converter 4, an automatic transmission 5, a differential 10, drive shafts 11A, 11B, drive wheels 12A, 12B, and so forth.

The motor generator 2, which is an example of an electric motor, includes a rotor shaft 2a, a stator 2b, and a rotor 2c. The motor generator 2 may function as a driving source that generates power for moving the electric vehicle 1. The motor generator 2 is configured to generate power by using electricity from a battery (not illustrated), thereby driving the drive wheels 12A, 12B. In addition, the motor generator 2 is configured to convert the rotational energy from the drive wheels 12A, 12B into electric energy with which the battery is to be charged.

In the motor generator 2, the rotor 2c is rotatably disposed at a position radially inward of the stator 2b. In addition, the mechanical oil pump 3 is disposed in the motor generator 2. At a position radially inward of the rotor 2c, the mechanical oil pump 3 is connected to one end portion of the rotor shaft 2a. The mechanical oil pump 3 is driven in response to the rotation of the rotor shaft 2a, thereby supplying oil to parts that need to be cooled and lubricated, such as the motor generator 2. When the mechanical oil pump 3 is disposed radially inward of the rotor 2c of the motor generator 2, the width of the electric vehicle 1 in the axial direction can be made less than that when the mechanical oil pump 3 is disposed so as to be coaxial with an output shaft 4f and alongside the motor generator 2. Hereinafter, "axial direction" in the embodiments of the present disclosure will signify the axial direction of the rotor shaft 2a unless otherwise specified.

The torque converter 4 includes a pump impeller 4a, a turbine runner 4b, a stator 4c, a one-way clutch (not illustrated), a cover 4d, a lock-up clutch 4e, the output shaft 4f, and so forth. The torque converter 4 is disposed coaxially with the motor generator 2. The rotor shaft 2a of the motor generator 2 is connected to the pump impeller 4a via the cover 4d. The pump impeller 4a transmits torque to the turbine runner 4b through the use of hydraulic fluid. The stator 4c is configured to amplify the torque that is transmitted from the pump impeller 4a to the turbine runner 4b. The one-way clutch is configured to restrict the rotational direction of the stator 4c to one direction. The lock-up clutch 4e is configured to allow the power to be directly transmitted from the cover 4d to the output shaft 4f when being engaged. One end portion of the output shaft 4f, which is on the motor generator 2 side, is connected to the turbine runner 4b, and the other end portion of the output shaft 4f is connected to an input shaft 6 of the automatic transmission 5.

The automatic transmission 5 includes the input shaft 6, an output shaft 7, a low-speed shifting mechanism 8, a high-speed shifting mechanism 9, and so forth. The input shaft 6 and the output shaft 7 are disposed so as not to be coaxial with each other (i.e., the axis of the input shaft 6 and the axis of the output shaft 7 are offset from each other).

The low-speed shifting mechanism 8 includes a gear 8a coupled to the input shaft 6, a gear 8b rotatably supported by the output shaft 7 and meshing with the gear 8a, a dog clutch 8c, and so forth. The dog clutch 8c is a synchromesh dog clutch. The dog clutch 8c includes a clutch gear 8d disposed so as to be rotatable together with the gear 8b in an integrated manner, a clutch hub 8e coupled to the output shaft 7, and a coupling sleeve 8f.

The dog clutch 8c is placed in an engaged state when external teeth provided on the outer periphery of the clutch gear 8d and external teeth provided on the outer periphery of the clutch hub 8e are meshed with internal teeth provided on the inner periphery of the coupling sleeve 8f. The dog clutch 8c is placed in a disengaged state when the internal teeth of the coupling sleeve 8f are disengaged from the external teeth of the clutch gear 8d and the external teeth of the clutch hub 8e, or when the internal teeth of the coupling sleeve 8f are disengaged from the external teeth of the clutch gear 8d or from the external teeth of the clutch hub 8e. The gear 8b and the output shaft 7 are connected to each other via the dog clutch 8c when the dog clutch 8c is placed in the engaged state by moving the coupling sleeve 8f with the use of an actuator (not illustrated). The gear 8b and the output shaft 7 are disconnected from each other when the dog clutch 8c is placed in the disengaged state by moving the coupling sleeve 8f with the use of the actuator (not illustrated).

The high-speed shifting mechanism 9 includes a gear 9a rotatably supported by the input shaft 6, a gear 9b coupled to the output shaft 7 and meshing with the gear 9a, a friction clutch 9c, and so forth. The friction clutch 9c includes a driven plate 9d disposed so as to be rotatable together with the gear 9a in an integrated manner, and a drive plate 9e coupled to the input shaft 6.

When the driven plate 9d and the drive plate 9e are pressed against each other by an actuator (not illustrated), the friction clutch 9c is placed in an engaged state, and thus the gear 9a and the input shaft 6 are connected to each other via the friction clutch 9c. When the driven plate 9d and the drive plate 9e are no longer pressed against each other by the actuator (not illustrated), the friction clutch 9c is placed in a disengaged state, and thus the gear 9a and the input shaft 6 are disconnected from each other.

In the automatic transmission 5, when the dog clutch 8c is placed in the engaged state and the friction clutch 9c is placed in the disengaged state, the torque input into the input shaft 6 from the output shaft 4f of the torque converter 4 is changed at a gear ratio of a low-speed shift stage by the low-speed shifting mechanism 8 and then the changed torque is transmitted to the output shaft 7. In the automatic transmission 5, when the dog clutch 8c is placed in the disengaged state and the friction clutch 9c is placed in the engaged state, the torque input into the input shaft 6 from the output shaft 4f of the torque converter 4 is changed at a gear ratio of a high-speed shift stage by the high-speed shifting mechanism 9 and then the changed torque is transmitted to the output shaft 7. When the dog clutch 8c and the friction clutch 9c are both placed in the disengaged state, the automatic transmission 5 achieves a shift stage at which power transmission is interrupted. As a result, the automatic transmission 5 is placed in a neutral state where the power input into the input shaft 6 from the output shaft 4f of the torque converter 4 is not transmitted to the output shaft 7.

During upshifting for shifting the automatic transmission 5 from a low-speed shift stage (i.e., a low gear) to a high-speed shift stage (i.e., a high gear), the friction clutch 9c that has been in the disengaged state is engaged while the dog clutch 8c that has been in the engaged state is disengaged. During downshifting for shifting the automatic transmission 5 from a high-speed shift stage to a low-speed shift stage, the friction clutch 9c that has been in the engaged state is disengaged after being slipped while the dog clutch 8c that has been in the disengaged state is engaged. As a result, the responsiveness during downshifting is kept sufficiently high.

The gear 9b coupled to the output shaft 7 meshes also with a differential ring gear 10a, which is a final driven gear provided in the differential 10. The gear 9b and the differential ring gear 10a constitute a pair of final gears used to transmit power between the automatic transmission 5 and the differential 10. The power transmitted from the gear 9b to the differential ring gear 10a is transmitted via the differential 10 to the drive shafts 11A, 11B connected to the drive wheels 12A, 12B, thereby driving the drive wheels 12A, 12B.

In the electric vehicle 1 according to the first embodiment, the torque converter 4 is coaxial with the motor generator 2 and disposed on a power transmission path between the motor generator 2 and the automatic transmission 5. With this configuration, the torque output from the motor generator 2 can be amplified by the torque converter 4 and the amplified torque can be input into the automatic transmission 5.

Thus, in the electric vehicle 1 according to the first embodiment, even when the size of the motor generator 2 is reduced, it is possible to input, into the automatic transmission 5, substantially the same magnitude of torque as that when the torque converter 4 is not disposed on the power transmission path between the motor generator 2 and the automatic transmission 5. The reduction in size of the motor generator 2 accordingly leads to cost reduction and an increase in the flexibility in an installation space. In addition, it is possible to increase the torque that is transmitted from the motor generator 2 to the drive wheels 12A, 12B without causing reduction in the flexibility in an installation space due to setting of the range of gear ratios of the automatic transmission 5 to a range of higher gear ratios and without causing a cost increase due to an increase in size of the motor generator 2.

In the electric vehicle 1 according to the first embodiment, the torque converter 4 is disposed on the power transmission path between the motor generator 2 and the automatic transmission 5. As a result, transmission of a disturbance from a road surface to the motor generator 2 can be reduced by the torque converter 4. Thus, it is possible to increase the accuracy of controlling the motor generator 2, thereby enhancing the efficiency.

In addition, in the electric vehicle 1 according to the first embodiment, the mechanical oil pump 3 is disposed, at a position upstream of the automatic transmission 5, on the power transmission path through which the power generated by the motor generator 2 is transmitted to the drive shafts 11A, 11B. Thus, in a state in which the automatic transmission 5 is in a neutral state where no power is transmitted from the automatic transmission 5 to the drive shafts 11A, 11B, the mechanical oil pump 3 can be driven by the power generated by the motor generator 2. Therefore, for example, even while the vehicle is at a standstill, the oil can be supplied from the mechanical oil pump 3 to the parts that need to be cooled and lubricated, such as the motor generator 2.

Second Embodiment

Figure 2:
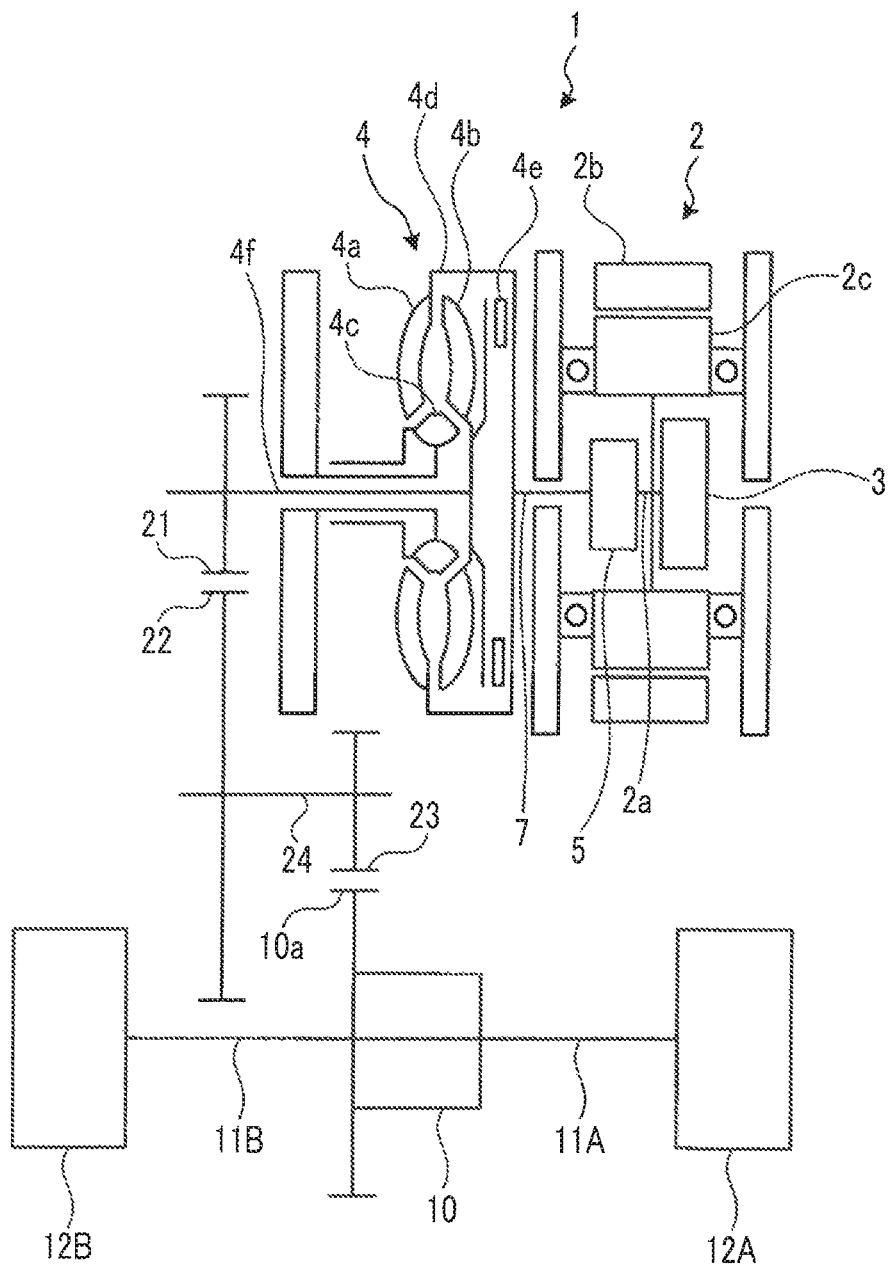
FIG. 2 is a skeleton diagram illustrating the schematic configuration of an electric vehicle according to a second embodiment.

Hereinafter, an electric vehicle 1 according to a second embodiment of the present disclosure will be described. FIG. 2 is a skeleton diagram illustrating the schematic configuration of the electric vehicle according to the second embodiment. With regard to the elements assigned with the same reference symbols as those in FIG. 1 and in the description of the electric vehicle 1 according to the first embodiment, detailed description will be omitted.

As illustrated in FIG. 2, in the electric vehicle 1 according to the second embodiment, the motor generator 2, the mechanical oil pump 3, the torque converter 4, and the automatic transmission 5 are disposed coaxially with each other. The mechanical oil pump 3 is disposed in the motor generator 2. At a position radially inward of the rotor 2c, the mechanical oil pump 3 is connected to one end portion of the rotor shaft 2a. The automatic transmission 5 is disposed at a position that is radially inward of the rotor 2c of the motor generator 2 and that is closer to the torque converter 4 than the mechanical oil pump 3 is. The automatic transmission 5 changes the torque, which has been transmitted thereto from the rotor shaft 2a of the motor generator 2, at a predetermined gear ratio, and then transmits the changed torque from the output shaft 7 to the cover 4d of the torque converter 4. The configuration of the automatic transmission 5 is not limited to the configuration in the first embodiment that has been described with reference to FIG. 1. The automatic transmission 5 may have another configuration. The automatic transmission 5 may be, for example, a belt-driven continuously variable transmission.

In the electric vehicle 1 according to the second embodiment, a counter shaft 24 provided with a counter driven gear 22 and a final drive gear 23 is disposed on an axis that is offset from the axis of the output shaft 4f of the torque converter 4 (i.e., is disposed so as not to be coaxial with the output shaft 4f of the torque converter 4). The counter driven gear 22 meshes with a counter drive gear 21 disposed on the output shaft 4f of the torque converter 4. The final drive gear 23 meshes with the differential ring gear 10a.

The torque input into the cover 4d of the torque converter 4 from the output shaft 7 of the automatic transmission 5 is amplified by the torque converter 4. The amplified torque is transmitted from the output shaft 4f of the torque converter 4 to the counter drive gear 21, the counter driven gear 22, the counter shaft 24, and the final drive gear 23 in this order. The torque transmitted from the final drive gear 23 to the differential ring gear 10a is transmitted to the drive shafts 11A, 11B connected to the drive wheels 12A, 12B via the differential 10, thereby driving the drive wheels 12A, 12B.

In the electric vehicle 1 according to the second embodiment, the automatic transmission 5 is disposed radially inward of the rotor 2c of the motor generator 2. With this configuration, the width of the electric vehicle 1 in the axial direction can be made less than that when the automatic transmission 5 is disposed so as to be coaxial with the motor generator 2 and alongside the motor generator 2.

Figure 3:
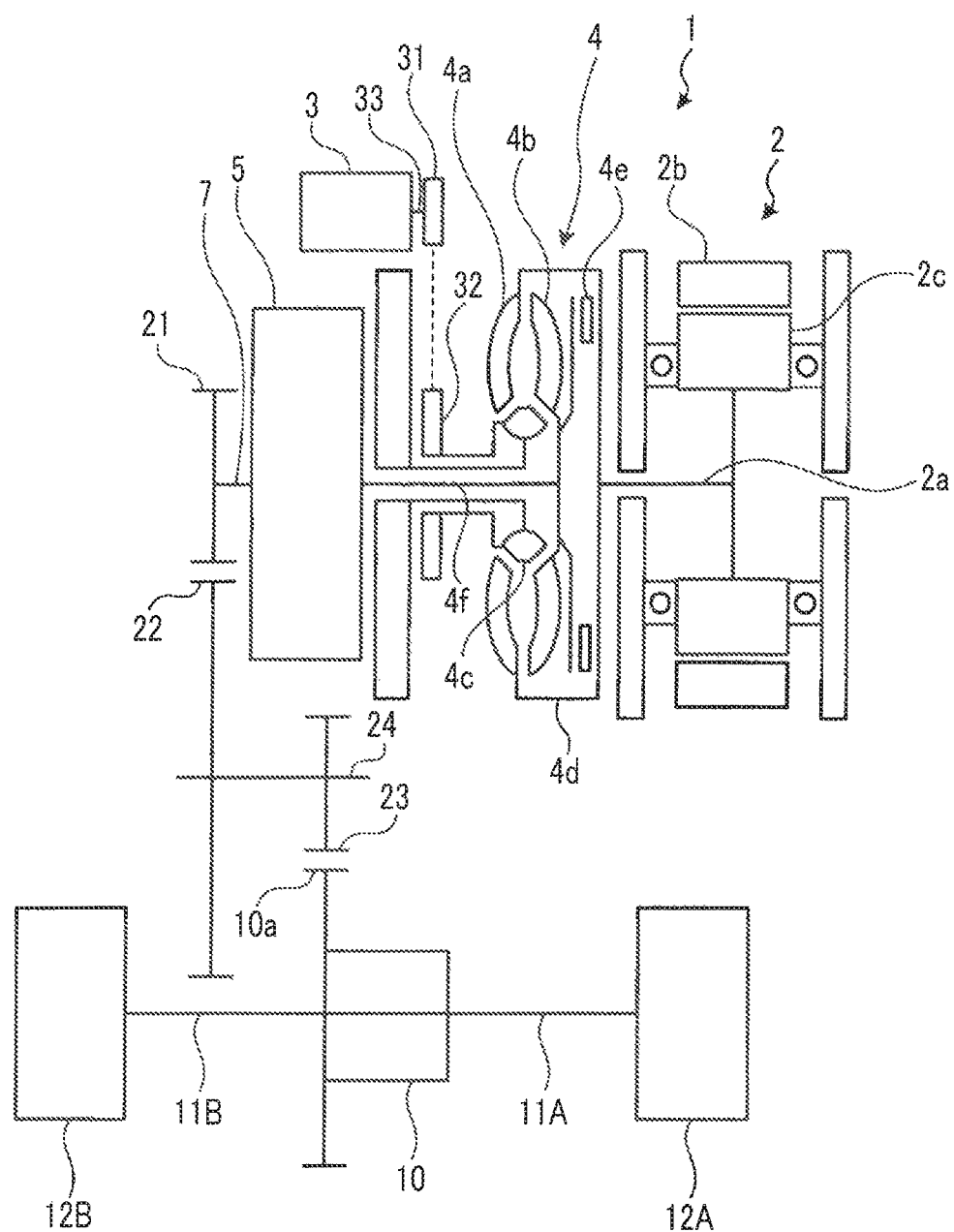
FIG. 3 is a skeleton diagram illustrating the schematic configuration of an electric vehicle according to a modified example of the second embodiment illustrated in FIG. 2, FIG. 3 illustrating the electric vehicle in which a mechanical oil pump and an automatic transmission are disposed outside a motor generator.

The configuration of the electric vehicle 1 according to the second embodiment illustrated in FIG. 2 may be modified such that the mechanical oil pump 3 and the automatic transmission 5 are disposed outside the motor generator 2 as illustrated in FIG. 3.

In the electric vehicle 1 illustrated in FIG. 3, the automatic transmission 5 is coaxial with the motor generator 2 and the torque converter 4, and is disposed on the opposite side of the torque converter 4 from the motor generator 2. The automatic transmission 5 changes the torque, which has been transmitted thereto from the output shaft 4f of the torque converter 4, at a predetermined gear ratio, and then transmits the changed torque from the output shaft 7 to the counter drive gear 21.

In the electric vehicle 1 illustrated in FIG. 3, the mechanical oil pump 3 is disposed so as to be coaxial with neither the motor generator 2 nor the torque converter 4. The mechanical oil pump 3 includes an input gear 31 and an input shaft 33. The input gear 31 receives power by meshing with an output gear 32 that rotates together with the stator 4c of the torque converter 4. The input shaft 33 is provided with the input gear 31. The mechanical oil pump 3 is driven by the power transmitted thereto via the output gear 32, the input gear 31, and the input shaft 33, in response to the rotation of the stator 4c of the torque converter 4. Thus, the mechanical oil pump 3 supplies the oil to the parts that need to be cooled and lubricated, such as the motor generator 2.

In the electric vehicle 1 illustrated in FIG. 3, the mechanical oil pump 3 can be driven in response to the rotation of the stator 4c of the torque converter 4 that is caused by the power generated by the motor generator 2. In addition, in the electric vehicle 1 illustrated in FIG. 3, the mechanical oil pump 3 can be driven by a rotational force from the drive wheels 12A, 12B. In other words, while the electric vehicle 1 is coasting with the motor generator 2 stopped, the lock-up clutch 4e of the torque converter 4 is kept in a disengaged state and the rotational force from the drive wheels 12A, 12B is transmitted to the stator 4c through the power transmission path. As a result, the mechanical oil pump 3 can be kept driven until the speed of the electric vehicle 1 becomes a low vehicle speed immediately before the electric vehicle 1 stops.

Figure 4:
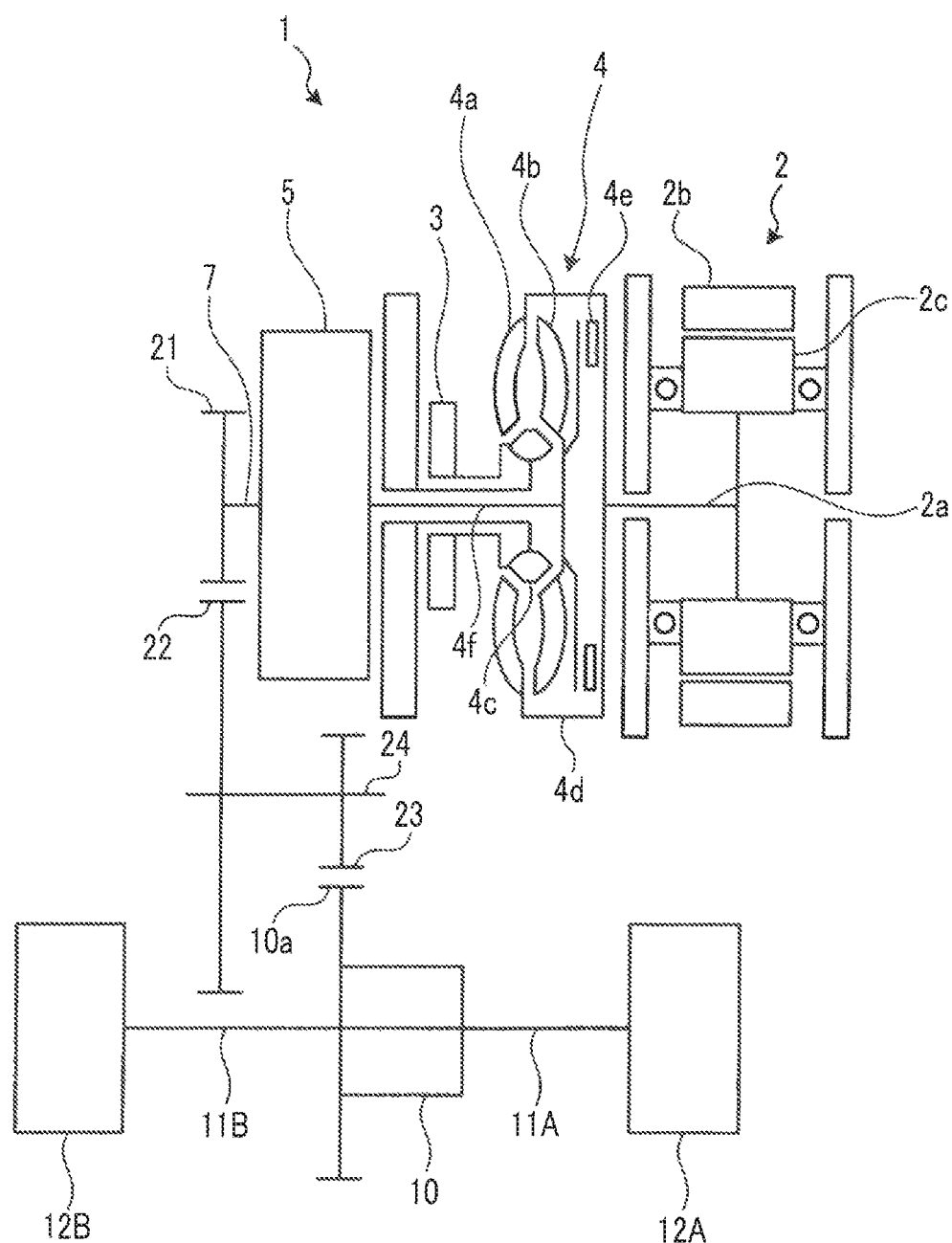
FIG. 4 is a skeleton diagram illustrating a modified example of the electric vehicle illustrated in FIG. 3, FIG. 4 illustrating the schematic configuration of an electric vehicle in which the mechanical oil pump is disposed coaxially with the motor generator.

The configuration of the electric vehicle 1 according to the modified example of the second embodiment illustrated in FIG. 3 may be modified such that the mechanical oil pump 3 is disposed coaxially with the motor generator 2, the torque converter 4, and the automatic transmission 5 and downstream of the torque converter 4 in the direction of power transmission from the motor generator 2 to the drive wheels 12A, 12B as illustrated in FIG. 4.

In the electric vehicle 1 illustrated in FIG. 4, the mechanical oil pump 3 is disposed on the power transmission path, at a position between the torque converter 4 and the automatic transmission 5, such that the mechanical oil pump 3 is rotatable together with the stator 4c of the torque converter 4. The mechanical oil pump 3 is driven in response to the rotation of the stator 4c of the torque converter 4, thereby supplying the oil to the parts that need to be cooled and lubricated, such as the motor generator 2.

In the electric vehicle 1 illustrated in FIG. 4, while the electric vehicle 1 is coasting, the lock-up clutch 4e of the torque converter 4 is kept in the disengaged state and a rotational force from the drive wheels 12A, 12B is transmitted to the stator 4c through the power transmission path. As a result, the mechanical oil pump 3 can be kept driven until the speed of the electric vehicle 1 becomes a low vehicle speed immediately before the electric vehicle 1 stops.

Figure 5:
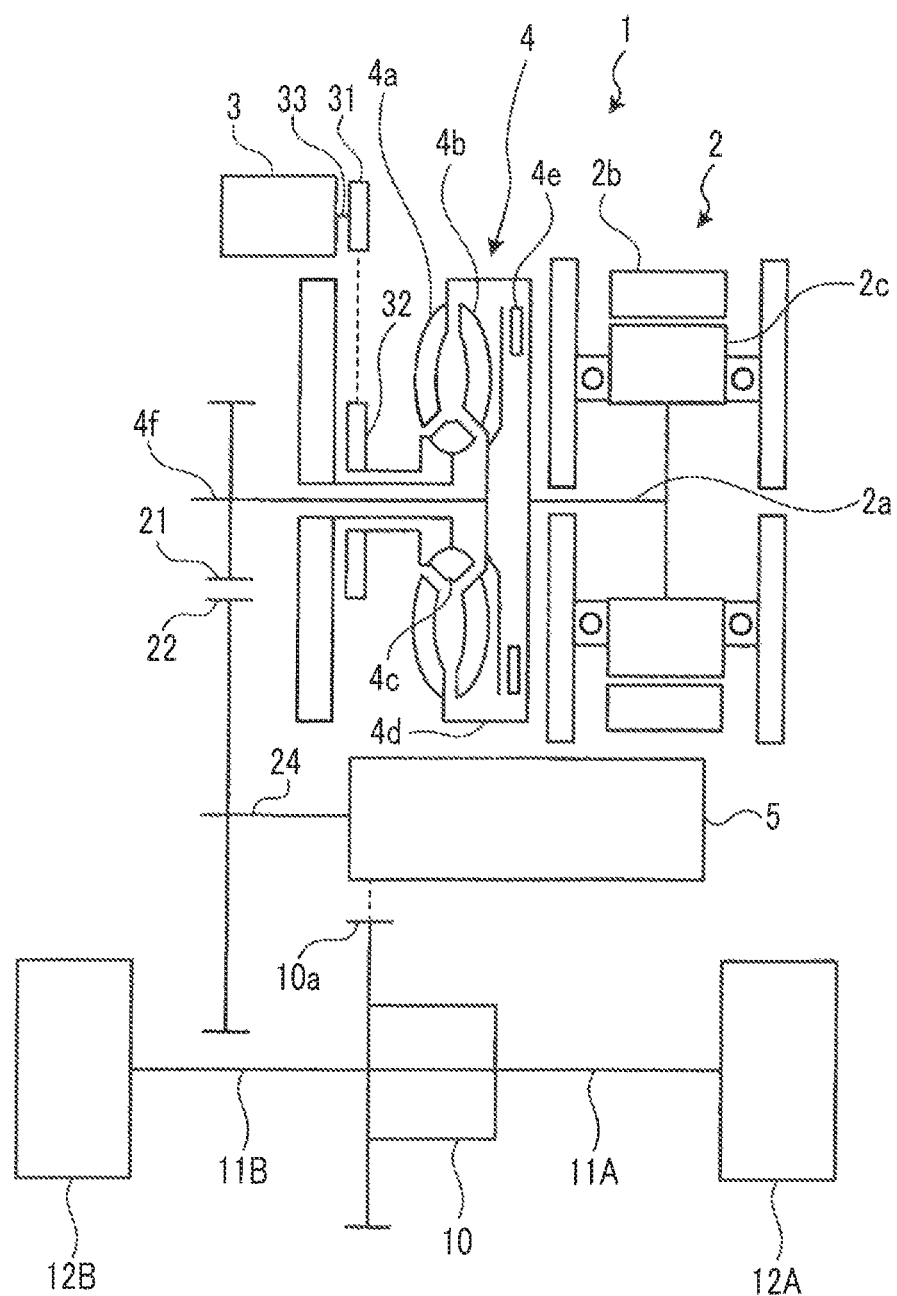
FIG. 5 is a skeleton diagram illustrating a modified example of the electric vehicle illustrated in FIG. 3, FIG. 5 illustrating the schematic configuration of an electric vehicle in which the automatic transmission is disposed so as not to be coaxial with the motor generator.
Figure 6:
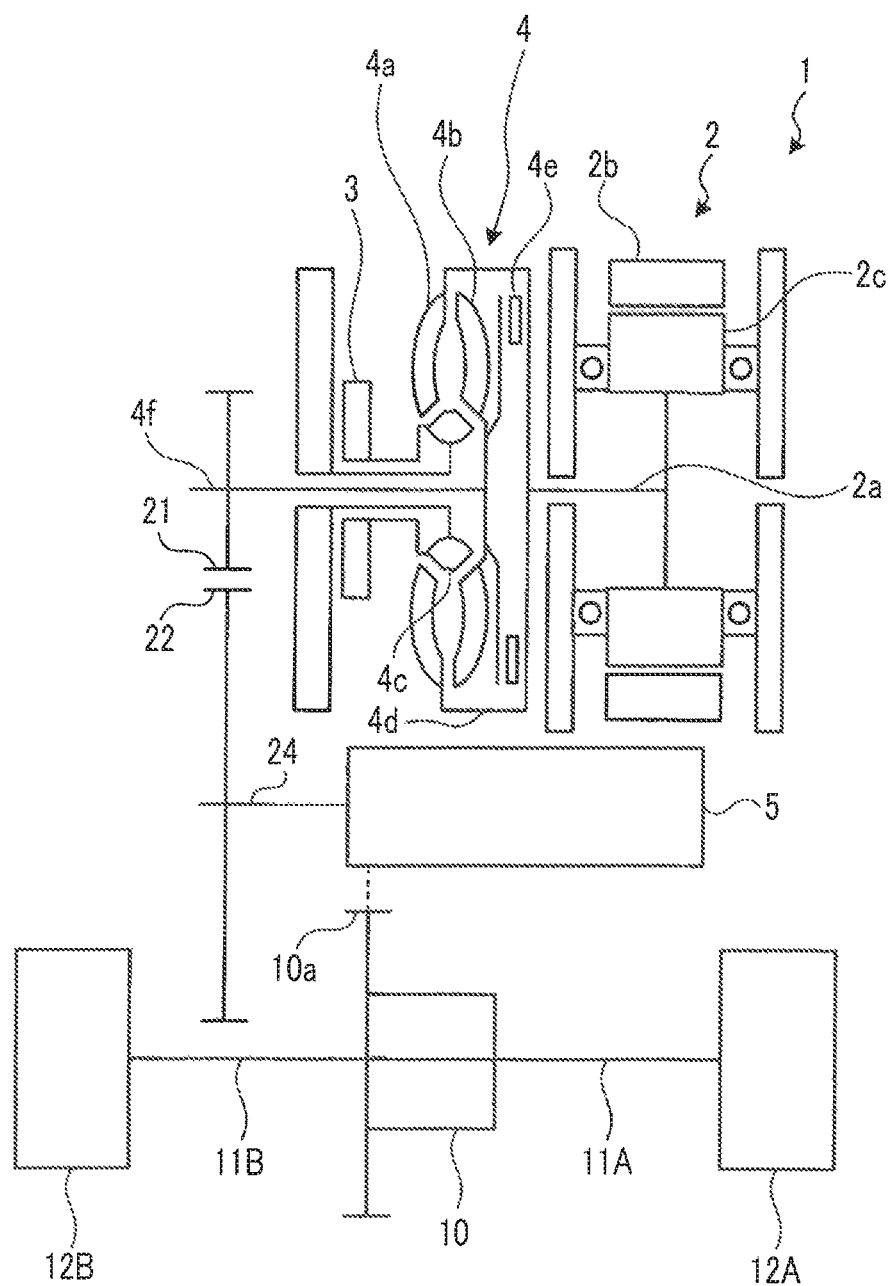
FIG. 6 is a skeleton diagram illustrating a modified example of the electric vehicle illustrated in FIG. 4, FIG. 6 illustrating the schematic configuration of an electric vehicle in which the automatic transmission is disposed so as not to be coaxial with the motor generator.

The configuration of the electric vehicle 1 according to the modified example of the second embodiment illustrated in FIG. 3 may be modified such that the automatic transmission 5 is disposed coaxially with the counter shaft 24 that is disposed so as not to be coaxial with the motor generator 2 as illustrated in FIG. 5. The configuration of the electric vehicle 1 according to the modified example of the second embodiment illustrated in FIG. 4 may be modified such that the automatic transmission 5 is disposed coaxially with the counter shaft 24 that is disposed so as not to be coaxial with the motor generator 2 as illustrated in FIG. 6. With these configurations, the width of the electric vehicle 1 in the axial direction can be made less than that when the automatic transmission 5 is disposed outside the motor generator 2 and coaxially with the motor generator 2.

Third Embodiment

Figure 7:
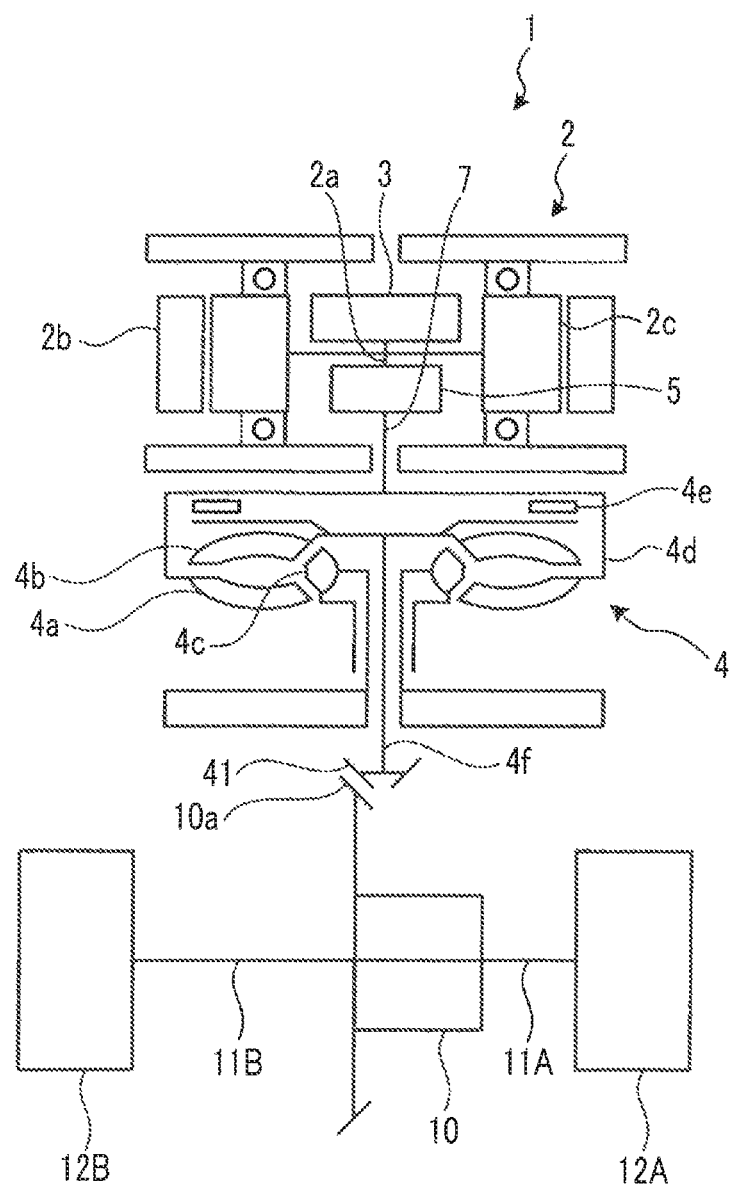
FIG. 7 is a skeleton diagram illustrating the schematic configuration of an electric vehicle according to a third embodiment.

Hereinafter, an electric vehicle 1 according to a third embodiment of the present disclosure will be described. FIG. 7 is a skeleton diagram illustrating the schematic configuration of the electric vehicle according to the third embodiment. With regard to the elements assigned with the same reference symbols as those in FIG. 1 to FIG. 6 and in the description of the electric vehicle 1 according to each of the first embodiment and the second embodiment, detailed description will be omitted.

As illustrated in FIG. 7, in the electric vehicle 1 according to the third embodiment, the motor generator 2, the mechanical oil pump 3, the torque converter 4, and the automatic transmission 5 are disposed coaxially with each other. The mechanical oil pump 3 is disposed in the motor generator 2. At a position radially inward of the rotor 2c of the motor generator 2, the mechanical oil pump 3 is connected to one end portion of the rotor shaft 2a. The automatic transmission 5 is disposed at a position that is radially inward of the rotor 2c of the motor generator 2 and that is closer to the torque converter 4 than the mechanical oil pump 3 is. The automatic transmission 5 changes the torque, which has been transmitted thereto from the rotor shaft 2a of the motor generator 2, at a predetermined gear ratio, and then transmits the changed torque from the output shaft 7 to the cover 4d of the torque converter 4. The configuration of the automatic transmission 5 is not limited to the configuration in the first embodiment that has been described with reference to FIG. 1. The automatic transmission 5 may have another configuration. The automatic transmission 5 may be, for example, a belt-driven continuously variable transmission.

In the electric vehicle 1 according to the third embodiment, the differential 10 is disposed on an axis perpendicular to the output shaft 4f of the torque converter 4, and a bevel gear 41 is disposed at the end portion of the output shaft 4f, which is on the opposite side of the output shaft 4f from the end portion on the motor generator 2-side. The differential ring gear 10a has beveled teeth meshing with the bevel gear 41. The power output from the output shaft 4f of the torque converter 4 is transmitted from the bevel gear 41 to the differential ring gear 10a. The power is transmitted to the drive shafts 11A, 11B connected to the drive wheels 12A, 12B via the differential 10, thereby driving the drive wheels 12A, 12B.

As described above, in the electric vehicle 1 according to the third embodiment, the power is transmitted from the torque converter 4 to the differential 10 with the use of the bevel gear 41 and the differential ring gear 10a having beveled teeth. As a result, a counter shaft or the like need not be disposed on the power transmission path between the torque converter 4 and the differential 10, which accordingly leads to cost reduction, an increase in the flexibility in an installation space, and weight reduction.

Figure 8:
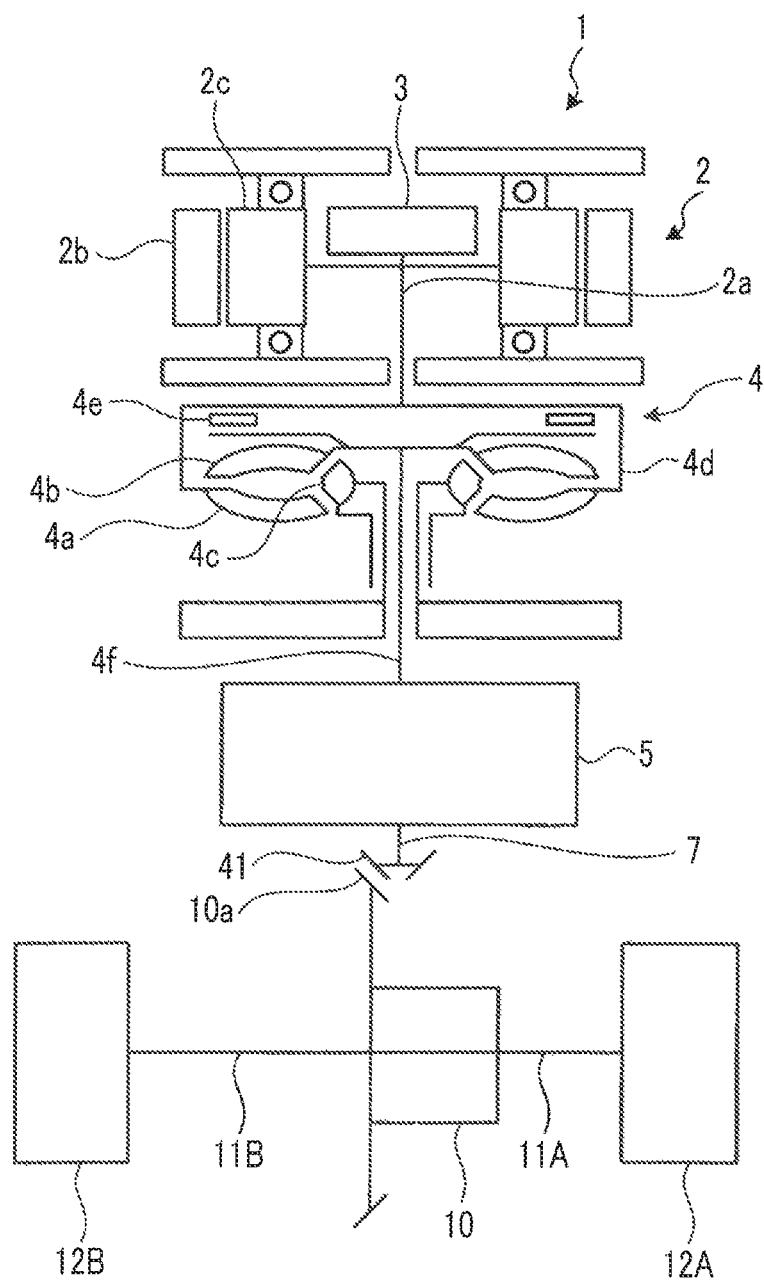
FIG. 8 is a skeleton diagram illustrating a modified example of the electric vehicle illustrated in FIG. 7, FIG. 8 illustrating the schematic configuration of an electric vehicle in which the automatic transmission is disposed outside the motor generator.

The configuration of the electric vehicle 1 according to the third embodiment illustrated in FIG. 7 may be modified such that the automatic transmission 5 is coaxial with the motor generator 2 and the torque converter 4 and is disposed on the opposite side of the torque converter 4 from the motor generator 2 as illustrated in FIG. 8. In the electric vehicle 1 illustrated in FIG. 8, the automatic transmission 5 changes the torque, which has been transmitted thereto from the output shaft 4f of the torque converter 4, at a predetermined gear ratio, and then transmits the changed torque from the output shaft 7 to the bevel gear 41.

Figure 9:
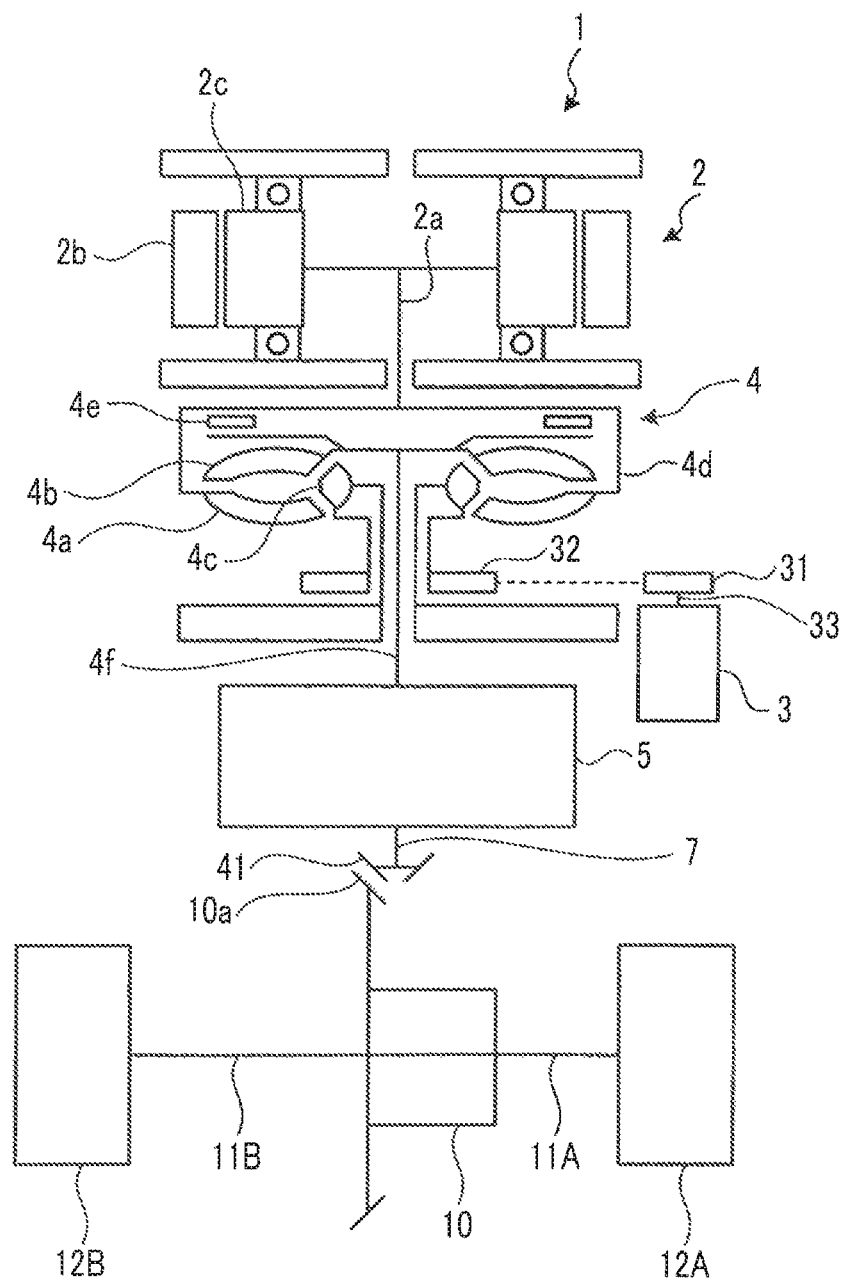
FIG. 9 is a skeleton diagram illustrating a modified example of the electric vehicle illustrated in FIG. 8, FIG. 9 illustrating the schematic configuration of an electric vehicle in which the mechanical oil pump is disposed outside the motor generator.

The configuration of the electric vehicle 1 according to the modified example of the third embodiment illustrated in FIG. 8 may be modified such that the mechanical oil pump 3 is disposed outside the motor generator 2 as illustrated in FIG. 9. In the electric vehicle 1 illustrated in FIG. 9, the mechanical oil pump 3 is disposed so as to be coaxial with neither the motor generator 2 nor the torque converter 4. The mechanical oil pump 3 includes the input gear 31 and the input shaft 33. The power is transmitted to the input gear 31 when the input gear 31 meshes with the output gear 32 that rotates together with the stator 4c of the torque converter 4. The input shaft 33 is provided with the input gear 31. The mechanical oil pump 3 is driven by the power transmitted via the output gear 32, the input gear 31, and the input shaft 33 in response to the rotation of the stator 4c of the torque converter 4, thereby supplying the oil to the parts that need to be cooled and lubricated, such as the motor generator 2.

What is claimed is:

1. An electric vehicle provided with an electric motor serving as a driving source, the electric vehicle not being provided with an internal combustion engine from which power is transmitted to drive wheels driven by power from the electric motor, the electric vehicle comprising:
   a torque converter that is disposed coaxially with an output shaft of the electric motor, and to which the power is transmitted from the electric motor;
   an automatic transmission disposed on a power transmission path between the electric motor and the drive wheels, the automatic transmission being configured to achieve a shift stage at which the power is interrupted; and
   a mechanical oil pump driven by the power from the electric motor, the mechanical oil pump being disposed on the power transmission path, at a position upstream of the automatic transmission in a direction of power transmission from the electric motor to the drive wheels,
   wherein the mechanical oil pump is disposed in the electric motor.

2. The electric vehicle according to claim 1, wherein an output shaft of the torque converter is provided with a bevel gear meshing with a final driven gear.

3. The electric vehicle according to claim 1, wherein the automatic transmission is disposed in the electric motor.

4. The electric vehicle according to claim 1, wherein the automatic transmission includes:
   a transmission input shaft and a transmission output shaft that are disposed in parallel to each other;
   a low-speed shifting mechanism that achieves a low-speed shift stage, the low-speed shifting mechanism being disposed on a power transmission path between the transmission input shaft and the transmission output shaft, and the low-speed shifting mechanism being disposed coaxially with the transmission output shaft;
   a high-speed shifting mechanism that achieves a high-speed shift stage, the high-speed shifting mechanism being disposed on the power transmission path between the transmission input shaft and the transmission output shaft, and the high-speed shifting mechanism being disposed coaxially with the transmission input shaft;
   a synchromesh dog clutch that permits and interrupts power transmission between the transmission output shaft and the low-speed shifting mechanism; and
   a friction clutch that permits and interrupts power transmission between the transmission input shaft and the high-speed shifting mechanism.

* * * * *